United States Patent [19]

Ott

[11] Patent Number: 4,523,199
[45] Date of Patent: Jun. 11, 1985

[54] HIGH STABILITY DEMAND INK JET APPARATUS AND METHOD OF OPERATING SAME

[75] Inventor: Robert J. Ott, Newtown, Conn.

[73] Assignee: Exxon Research & Engineering Co., Florham Park, N.J.

[21] Appl. No.: 428,427

[22] Filed: Sep. 29, 1982

[51] Int. Cl.³ .................. G01D 9/00; G01D 15/16
[52] U.S. Cl. .................. 346/1.1; 346/140 R
[58] Field of Search .......... 346/140 PD, 75, 1.1; 400/126

[56] References Cited

U.S. PATENT DOCUMENTS

| | | | |
|---|---|---|---|
| 4,045,801 | 8/1977 | Iwasaki | 346/140 R |
| 4,068,144 | 1/1978 | Toye | 346/140 PD |
| 4,146,901 | 3/1979 | Fowler | 346/140 R |
| 4,199,770 | 4/1980 | Schnarr | 346/140 R |
| 4,228,440 | 10/1980 | Horike et al. | 346/75 |
| 4,231,047 | 10/1980 | Iwasaki et al. | 346/75 |
| 4,241,406 | 12/1980 | Kennedy et al. | 364/518 |
| 4,291,316 | 9/1981 | Kakeno et al. | 346/140 R |
| 4,389,657 | 6/1983 | McMahon | 346/140 PD |
| 4,395,719 | 7/1983 | Majewski | 346/140 PD |

*Primary Examiner*—E. A. Goldberg
*Assistant Examiner*—M. J. Reinhart

[57] ABSTRACT

An ink jet chamber including an orifice expands and contracts in response to the state of energization of a transducer coupled thereto. An inlet channel also expands and contracts in response to the state of another transducer coupled thereto such that the one transducer and the other transducer are energized in complementary fashion.

10 Claims, 6 Drawing Figures

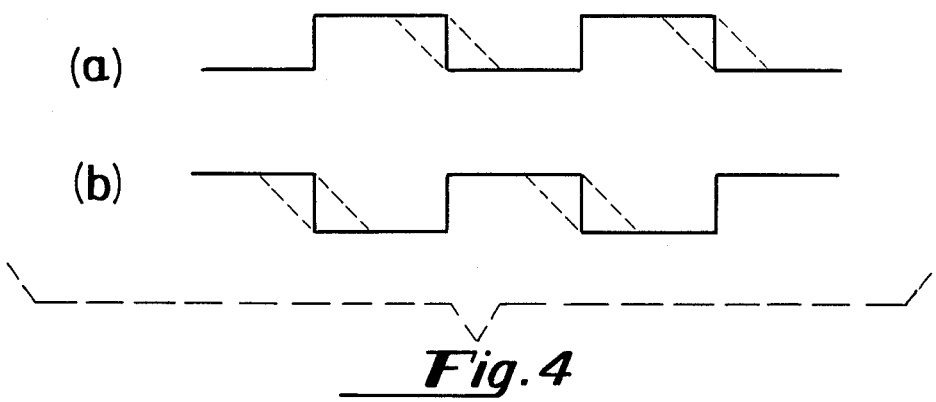
Fig. 4
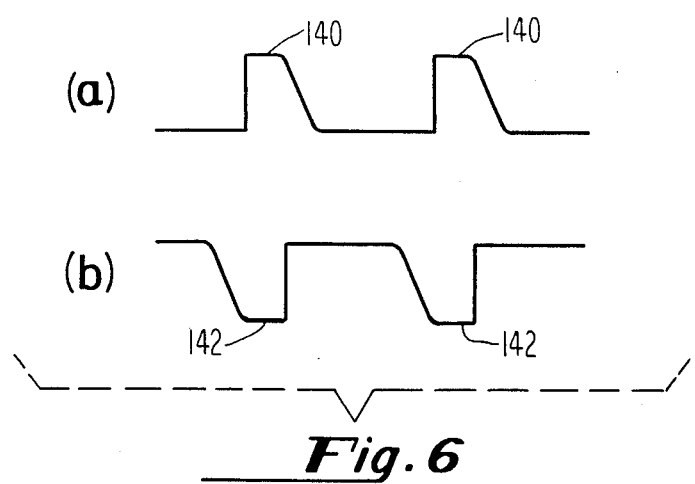
Fig. 5
Fig. 6

HIGH STABILITY DEMAND INK JET APPARATUS AND METHOD OF OPERATING SAME

BACKGROUND OF THE INVENTION

This invention relates to demand or impulse ink jets of the type wherein a droplet of ink is ejected from an orifice in response to a command at a frequency which can vary as the frequency of the commands.

In many applications, it is desirable to operate a demand ink jet apparatus with a high frequency, e.g., 9 to 10 KHz. In many instances, it is difficult to achieve a stable high frequency operation of an ink jet. Such stable, high frequency operation is, in part, difficult to achieve because of the nature of filling of the chamber prior to firing of the demand ink jet. Specifically, in the typical demand ink jet, filling of the chamber is a function of the manner in which the chamber expands which, in turn, may be a function of the operating characteristics of the transducer associated with the chamber.

Where an ink jet chamber is filled as the transducer is relaxed, the manner in which the chamber is filled is a function of the fall time of the pulse or signal which energizes the transducer. Where the fall time is extended, i.e., the pulse decays slowly over a period of time, the chamber will fill gradually over an extended period of time making high frequency operation difficult. On the other hand, a rapid fall time will produce rapid filling of the chamber. It should, therefore, be appreciated that variations in the fall time may have a substantial effect on the filling action of the chamber which, in turn, will greatly affect the position of the meniscus within the orifice of the chamber. This can result in unstable operation (e.g., satellites, air ingestion or off line droplets) at high frequencies where the position of the meniscus varies as a function of time. Of course, problems can be compounded where a plurality of ink jets are utilized where the fall times of the driving pulses of the ink jets vary from one jet to another.

SUMMARY OF THE INVENTION

It is an object of this invention to provide a demand ink jet which may be operated with stability at high frequencies.

It is a more specific object of this invention to provide a demand ink jet which may be operated with stability at high frequencies by controlling the filling of the chamber of the ink jet after firing.

It is a further object of this invention to eliminate sensitivity to the aspect ratio of an ink jet orifice by eliminating a substantial negative going meniscus.

In accordance with these and other objects of the invention, a demand ink jet apparatus comprises an ink jet chamber including a droplet ejection orifice and an ink supply inlet and a supply channel coupled to the inlet. Transducer means are coupled to the chamber for expanding and contracting the chamber so as to eject a droplet of ink on demand as the chamber contracts. The transducer means is also coupled to the supply channel for contracting the supply channel as the chamber expands and expanding the supply channel as the chamber contracts.

In the preferred embodiment of the invention, transducer means is coupled to the chamber and the supply channel such that the volume to which the chamber expands and contracts substantially equals the volume to which the supply channel expands and contracts.

In the preferred embodiment, restrictor means are places between the inlet and the channel so as to substantially limit flow of ink from the chamber to the channel. Preferably, the flow resistance is substantially non-linear such that the resistance to flow in the direction from the channel to the chamber is substantially less than the resistance to flow from the chamber to the channel.

Preferably, the transducer means comprises a first transducer and a second transducer with the first transducer being coupled to the chamber and the second transducer being coupled to the channel.

In accordance with this invention, it will be appreciated that expansion of the chamber occurs substantially simultaneously with the contraction of the channel and expansion of the channel occurs substantially simultaneously with expansion of the chamber. This may be accomplished by driving the first transducer associated with the first chamber with a signal substantially complementary to the signal driving the second transducer associated with the channel.

BRIEF DESCRIPTION OF THE DRAWINGS

FIG. 4 illustrates waveforms utilized in driving the transducers shown in FIGS. 1 through 3;

FIG. 5 is a sectional view of an ink jet apparatus representing another embodiment of the invention; and FIG. 6 represents waveforms utilized in driving the transducer shown in FIG. 5.

DETAILED DESCRIPTION OF PREFERRED EMBODIMENTS

Figure 1:
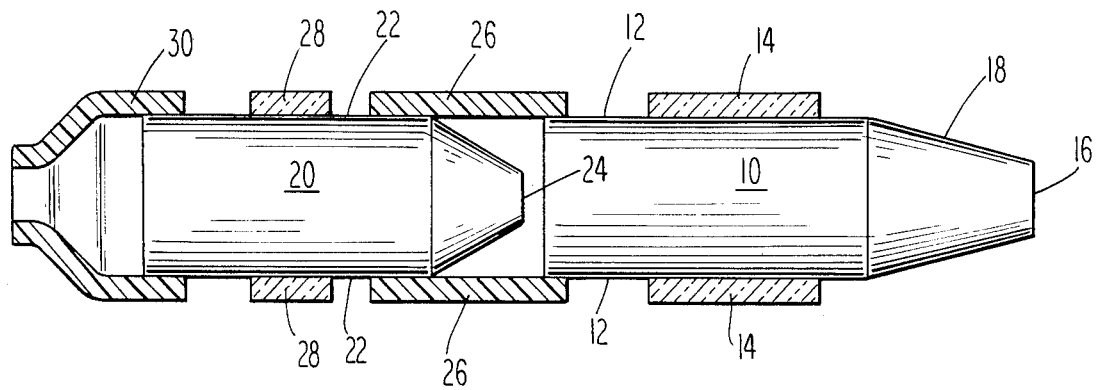
FIG. 1 is a sectional view of an ink jet apparatus representing one embodiment of the invention.

Referring to FIG. 1, the ink jet apparatus comprises an ink jet chamber 10 formed by walls 12 which are encircled with a cylindrical transducer 14. Chamber 10 includes a droplet ejection orifice 16 at the end of a tapered nozzle 18.

The ink jet apparatus further comprises a supply channel 20 formed by walls 22 with an opening 24 substantially aigned with and equal in size to the orifice 16 which serves as an inlet to the chamber 10. The walls 22 and 12 are coupled by a flexible cylindrical coupling 26 which serves a damping function to avoid unstable operation. Another cylindrical transducer 28 is coupled to the walls 22 and located between the coupling 26 and another flexible coupling 30 at the rear of the chamber.

Figure 2:
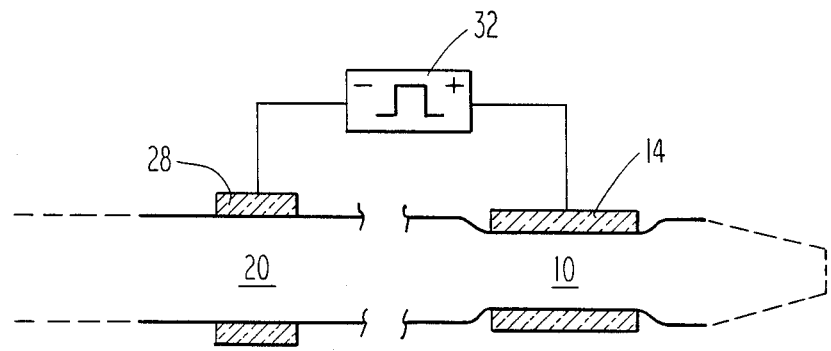
FIG. 2 is a partially schematic view of the ink jet apparatus of FIG. 1 wherein one of a pair of transducers is energized.
Figure 3:
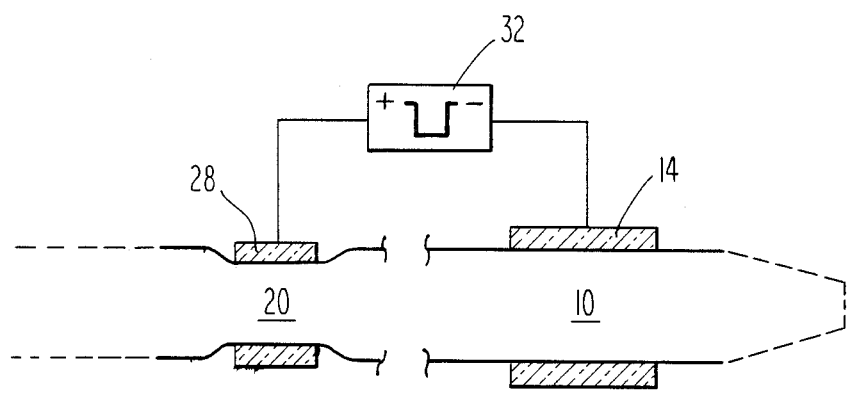
FIG. 3 is a partially schematic view of the ink jet apparatus of FIG. 1 wherein the other of a pair of transducers is energized.

In accordance with this invention, the cylindrical transducers 14 and 28 are alternately excited and relaxed; i.e., the transducers 14 and 28 are excited and relaxed such that the chamber 10 contracts while the channel 20 expands and the channel 20 contracts while the chamber 10 expands. The alternate excitation and relaxation is depicted in FIGS. 2 and 3. Preferably, the channel 20 and the chamber 20 expand a substantially equal amount.

In FIG. 2, the transducer 14 is excited so as to contract the volume 10 while the transducer 28 is relaxed so as to leave the volume of the channel 20 in the expanded state. The opposite is true in FIG. 3 where the transducer 14 is relaxed so as to leave the volume of the chamber 10 in the expanded state whereas the transducer 28 is excited so as to contract the volume of the channel 20. In order to achieve the phased expansion and contraction of the chamber 10 and the channel 20, the source of the driving signal voltage 32 has terminals which couple inverted signals to external electrodes of the transducers 14 and 28 as depicted by the plus and minus signs shown on the source 32. The interior electrodes o the transducers 14 and 28 are grounded.

Referring to FIG. 4, the waveform A depicts the signal voltage which is applied to the transducer 14 while the waveform B depicts the signal voltage which is supplied to the transducer 28. As shown in full, the signal voltages are inverted or complementary such that the period of expansion of the one chamber 10 occurs substantially simultaneously with the period of contraction of the other chamber 20 and vice versa. It will, however, be appreciated that the signal voltages need not be exactly complementary. in this connection, note the dotted lines in the waveforms a and b of FIG. 4 which depict the fall times for the pulses which can lead to something other than completely complementary signal voltages. However, it will be understood that such fall times may be utilized without adversely affecting the operation of the ink jets.

In operation, the ink jet apparatus of FIG. 1 relies upon the restricted inlet 24 in the tapered walls 34 which lead from the walls 32 for purposes of damping. As the transducer 14 associated with the chamber 10 contracts, the rearward flow of ink into the feed channel 20 is restricted. This in turn minimizes movement of the meniscus formed at the orifice 16 thus the transducer 14 relaxes. On the other hand, the contraction of the channel 20 by the excited transducer 28 fills the void within the chamber 10 as the chamber 10 expands in volume while the transducer 14 is relaxing. As a consequence, the negative pressure normally produced when the transducer 14 expands is compensated or equalized by contraction of the transducer 28 working in conjunction with the restricted inlet 24 to avoid a negative meniscus; i.e., a meniscus which contracts into the orifice. As a consequence, an unstable jet operation can be avoided.

By utilizing the foregoing system, the fall time of the voltage signal pulses shown in FIG. 4 are not particularly critical since the filling of the chamber 10 is predominantly controlled by the contraction of the channel 20 working in conjunction with the restricted inlet 24. As a consequence, the ink jet apparatus of FIG. 1 is capable of operating in a stable mode at high frequencies, e.g., 9 to 10 KHz. It will be appreciated that the combination of the channel 20 and the restricted inlet 24 therefore work synergistically, to produce a 100% increase in efficiency for a device which would otherwise be capable of operation at approximately 5 KHz.

Reference will now be made to FIG. 5 wherein another embodiment of the invention is shown employing an ink jet chamber 110 formed by walls 112 which expand and contract in response to the state of energization of a transducer 114 coupled to a diaphragm 116 through a foot 118. The apparatus of FIG. 5 further comprises an inlet supply channel 120 formed by walls 122 which is coupled to the chamber 110 through a restricted inlet 124. The inlet channel 120 expands and contracts as a function of the state of energization of a transducer 128 which is coupled to the diaphragm 116 to form a part of the chamber 120 through a foot 130. The supply channel 120 is in turn supplied from a manifold 132 which is coupled to the supply channel 120 through an opening 134.

In the embodiment of FIG. 5, signal voltages are applied between electrodes 136 and 138 of the transducers 114 and 128 to elongate and contract the transducers 114 and 128 in the direction of the chamber 110 and the channel 120. As the transducer 114 is energized, the transducer 114 contracts so as to expand the chamber 110 and permit filling through the inlet 124 while the chamber 120 contracts in coincidence with relaxation or a state of de-energization at the transducer 128. Subsequently, the transducer 114 is de-energized so as to contract the chamber 110 and expel a droplet of ink from the orifice 126 while the chamber 120 expands during energization of the transducer 128. The volume of expansion and contraction of the chamber 110 and the channel 120 are substantially equal. The inverted or complementary nature of the signal voltages applied across the transducers 114 and 128 of the electrodes 136 and 138 are depicted in waveforms a and b. In other words, the period of the positive going pulses of waveform representing a signal supplied to the transducer 114 generally coincide in time with the period of the zero or ground going pulses 142 in waveform b which is applied to the transducer 128. Conversely, the period of the ground going pulses 144 in wave a is substantially equal to the period of positive going pulses in the waveform b.

Further details concerning the operation of the transducers 114 and 128 associated with the chamber 110 and the channel 120 will be appreciated by reference to copending application Ser. No. 336,603, filed Jan. 4, 1982 wherein chambers or channels and transducers of this type are shown and disclosed in substantial detail. The aforesaid application is therefore incorporated herein by reference as though set forth in full. Although the invention has been described in terms of two particularly preferred embodiments, it will be appreciated that other embodiments and modifications will occur to those of ordinary skill in the art and such embodiments and modifications fall within the true spirit and scope of the invention as set forth in the appended claims.

I claim:

1. An ink jet apparatus comprising:
   an ink jet chamber including a droplet ejection orifice and an ink supply inlet;
   a supply channel coupled to said inlet for supplying ink thereto;
   restrictor means between said inlet and said channel so as to substantially preclude flow of ink from said chamber to said channel;
   transducer means coupled to said chamber for expanding and contracting said chamber so as to eject a droplet of ink on demand as the chamber contracts; and
   said transducer means also coupled to said supply channel for contracting said chamber as said channel expands and expanding said supply channel as said chamber contracts.

2. The ink jet apparatus of claim 1 wherein said transducer means is coupled to said chamber and said supply channel such that the volume which said chamber expands and contracts substantially equals the volume which said supply channel expands and contracts.

3. The ink jet apparatus of claim 1 wherein said transducer means comprises a first transducer and a second transducer, said first transducer being coupled to said chamber and said second transducer being coupled to said channel.

4. The apparatus of claim 3 comprising a means for changing the state of energization of said first transducer to expand said chamber and changing the state of energization of said second transducer to contract said channel in the same period.

5. The apparatus of claim 3 further comprising means for changing the state of energization of said first transducer and said second transducer to expand and contract said chamber by said first transducer in the same period as said second transducer expands and contracts said supply channel.

6. The apparatus of claim 1 wherein said inlet and orifice are substantially concentrically aligned.

7. The apparatus of claim 1 further comprising flexible connecting means between said supply channel and said chamber.

8. A method of operating an ink jet apparatus comprising an ink chamber including a droplet ejection orifice, an ink supply inlet and a supply channel coupled to said inlet for supplying ink thereto, said method comprising the following steps:

expanding the chamber so as to fill the chamber with ink;

contracting the channel so as to assist in filling the chamber while simultaneously expanding the chamber;

contracting the chamber so as to eject a droplet of ink;

expanding the channel while simultaneously contracting the chamber and ejecting a droplet of ink; and substantially precluding the flow of ink from said chamber to said supply channel.

9. The method of claim 8 wherein the period for expanding the chamber substantially equals the period for contracting the channel.

10. The method of claim 8 wherein the period for expanding and contracting the chamber substantially equals the period for expanding and contracting the channel.

* * * * *